United States Patent
Stolov

[11] Patent Number: 5,953,165
[45] Date of Patent: Sep. 14, 1999

[54] OPTICAL AIMING DEVICE

[75] Inventor: Evgeny Stolov, Jerusalem, Israel

[73] Assignee: Ophir Optronics Ltd., Jerusalem, Israel

[21] Appl. No.: 08/983,002

[22] PCT Filed: Jun. 27, 1996

[86] PCT No.: PCT/IL96/00030

§ 371 Date: Mar. 17, 1998

§ 102(e) Date: Mar. 17, 1998

[87] PCT Pub. No.: WO97/02462

PCT Pub. Date: Jan. 23, 1997

[30] Foreign Application Priority Data

Jul. 5, 1995 [IL] Israel ......................................... 114472

[51] Int. Cl.[6] .................................................. G02B 5/04
[52] U.S. Cl. ............................................. 359/834; 33/245
[58] Field of Search ..................... 33/245, 246; 359/428, 359/429, 430, 487, 496, 831, 833, 834, 495

[56] References Cited

U.S. PATENT DOCUMENTS

| | | |
|---|---|---|
| 3,511,556 | 5/1970 | Ammann ................................. 350/147 |
| 4,806,007 | 2/1989 | Bindon ................................... 350/569 |
| 5,002,364 | 3/1991 | Steenblik ............................... 350/144 |
| 5,369,888 | 12/1994 | Kay et al. . |
| 5,383,278 | 1/1995 | Kay . |
| 5,440,424 | 8/1995 | Wu et al. ............................... 359/496 |
| 5,579,159 | 11/1996 | Ito ......................................... 359/496 |

FOREIGN PATENT DOCUMENTS

| | | |
|---|---|---|
| 925107 | 3/1946 | France . |
| 1002999 | 9/1965 | United Kingdom . |

*Primary Examiner*—Cassandra Spyrou
*Assistant Examiner*—Euncha Cherny
*Attorney, Agent, or Firm*—Helfgott & Karas, PC.

[57] ABSTRACT

An optical aiming device including two optical elements, each characterized by a refractive index and a critical angle defining a total internal reflection plane, positioned one in front of the other substantially along an aiming axis, each optical element causing a portion of light impinging thereon at an angle greater than the critical angle, to be reflected, thereby defining a demarcation between a region of reflected light and non-reflected light, the optical elements being oriented such that the demarcations of each optical element intersect at a point lying substantially along the aiming axis.

9 Claims, 8 Drawing Sheets

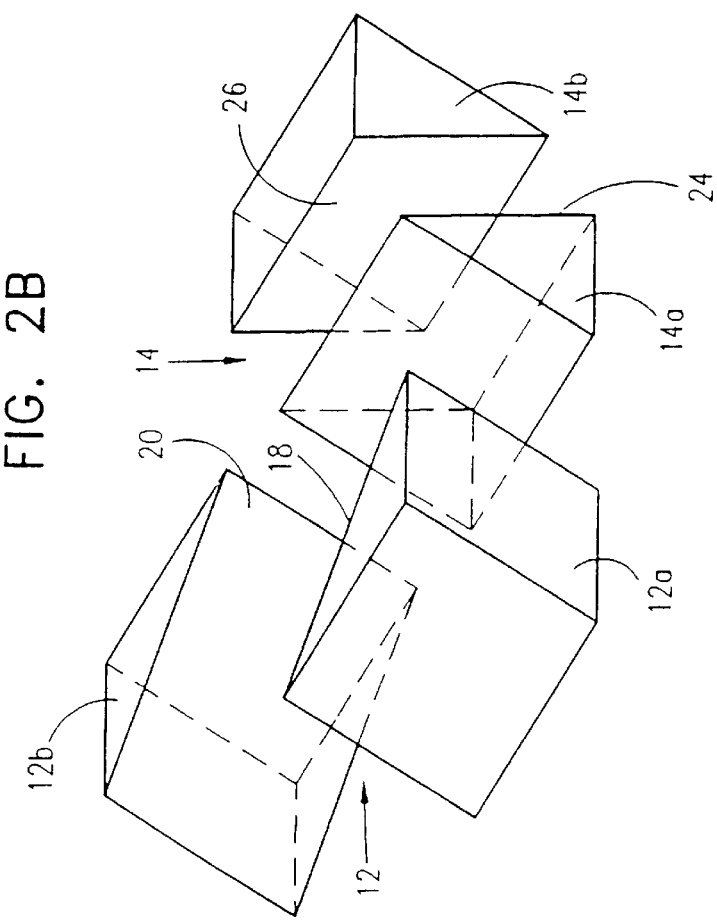
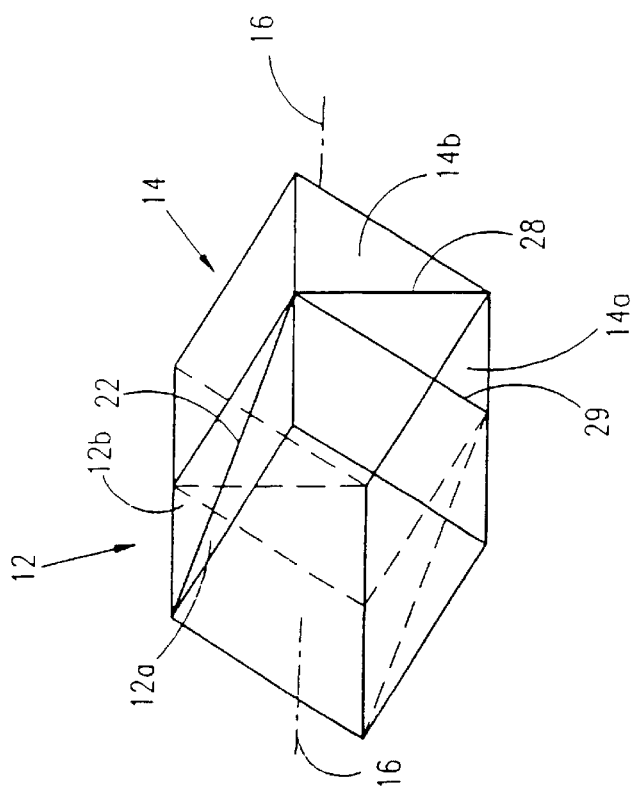

FIG. 3A
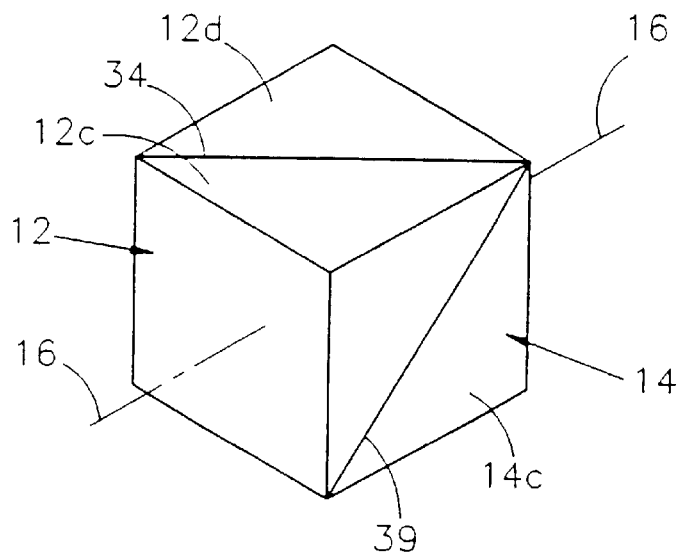
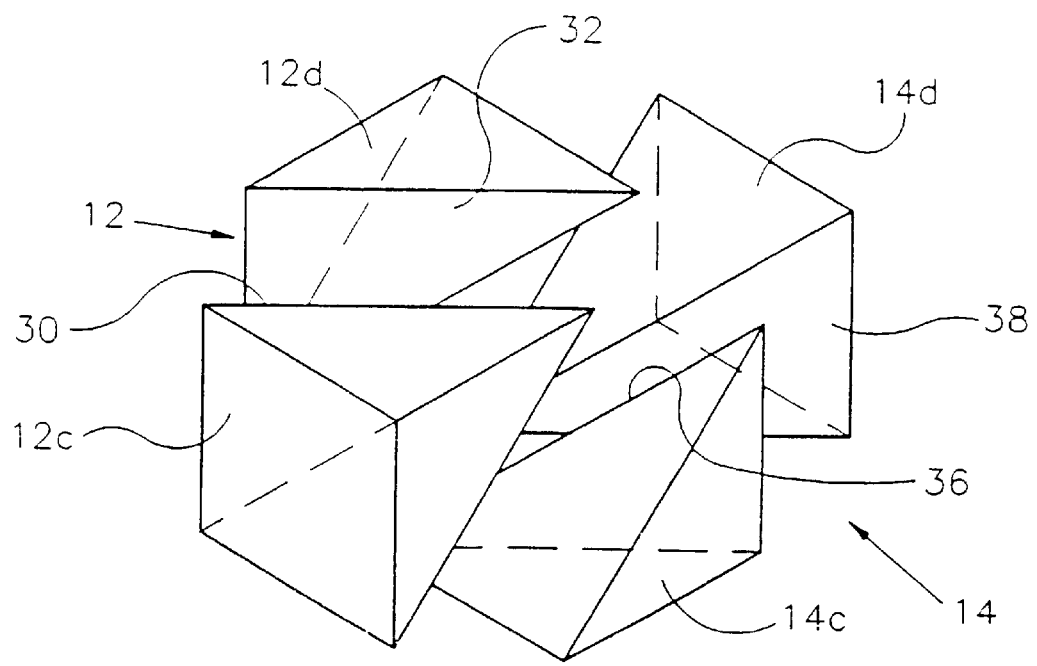
FIG. 3B

OPTICAL AIMING DEVICE

FIELD OF THE INVENTION

The present invention relates to optical aiming devices generally.

BACKGROUND OF THE INVENTION

Aiming devices, such as weapon sights, are well known in the art. Conventional non-optical aiming devices generally include two sights mounted on the weapon, a rear sight and a front sight. Both sights and the target, a total of three points, must be aligned with the user's eye in a straight line for accurate shooting. Aligning three points with the eye is a task which can be cumbersome and tiring.

Optical sights which overcome the problem of aligning three points are known, such as sights manufactured by C-More, Manassas, Va. USA, which are described in U.S. Pat. Nos. 5,369,888 and 5,383,278. Many laser sights are also known.

Another optical sight is the one manufactured by InterAims of Sweden under the tradename One V. Such a sight employs a laser diode which produces a red light which passes through a dichroic beam splitter. Red light is reflected towards the target and perceived by the user as a red dot. Rays in the rest of the visible light spectrum pass to the user's eye. The user only has to line up two points with his eye: the red dot and the target.

The red dot system has some drawbacks. It requires an electrical power source, and is relatively expensive, large in size and weight. A bright light source near the target makes it difficult to discern the red dot. It is extremely difficult to discern the red dot when aiming on a red background, and in any case there is color transmission distortion.

SUMMARY OF THE INVENTION

The present invention seeks to provide an improved, simple, effective and inexpensive optical aiming device which requires no external source of power, is compact in size and weight and causes minimum color distortion.

The aiming device includes two optical elements, such as prism assemblies, positioned one in front of the other along the length of the weapon. The user sights through the prism assemblies in the direction of the target.

With each prism assembly is associated a total internal reflection plane oriented at a critical angle with respect to an axis pointing to the target. Any portion of visible light emanating from the target and impinging on each prism assembly at an angle greater than the critical angle is reflected by the prism assembly, while any other portion of the visible light passes therethrough. In the reflected portion, light is reflected in a direction away from the user's eye and the reflected portion is perceived as being dark. Thus associated with each prism assembly is a clear region adjacent a dark region with a common demarcation arc therebetween.

When pointed at a target, the demarcation arc corresponds to a locus of points passing through the target. The clear region of each prism is caused by light coming from the target at angles with respect to the demarcation arc less than the critical angle, while the dark region is caused by light coming from the target at angles with respect to the demarcation arc greater than or equal to the critical angle.

The two prism assemblies are oriented such that their dark regions form an angle with respect to each other. This means that the demarcation arcs of each prism assembly are also oriented at an angle with respect to each other, intersecting at a common point. Since both demarcation arcs are aimed at the target, their common point of intersection lies on the line which points exactly to the target.

Thus the optical device is properly aimed by aligning two points: the intersection point of the demarcation arcs and the bull's eye of the target. The two demarcation arcs are analogous to longitudinal and latitudinal arcs which define the desired targeted point.

The view through a prism may be somewhat distorted due to the shape of the prism, as is known in the art. The present invention compensates for this effect by making each prism assembly with two optically identical prisms positioned such that their total internal reflection planes are located symmetrically with respect to each other. The combination of the prisms acts like a flat sheet of transparent material which passes light with substantially no distortion.

The present invention is characterized by a very small parallax, less than 1 milliradian for distances greater than 10 meters.

The material of the prisms may cause some dispersion of light therethrough. The dispersion is due to the fact that the critical angle associated with total internal reflection is a function of wavelength. The larger the wavelength the larger the critical angle. If both prisms of each prism assembly are made of the same material, there may be a dispersion of light, generally in the yellow color wavelength, due to the slight differences in critical angles for wavelengths in the visible spectrum.

The yellow streak is not generally annoying to the user, although it may be eliminated by making the prisms with materials having different dispersion characteristics, as is known in the art.

There is thus provided in accordance with a preferred embodiment of the present invention, an optical aiming device including two optical elements, each characterized by a refractive index and a critical angle defining a total internal reflection plane, positioned one in front of the other substantially along an aiming axis, each optical element causing a portion of light impinging thereon at an angle greater than the critical angle, to be reflected, thereby defining a demarcation between a region of reflected light and non-reflected light, the optical elements being oriented such that the demarcations of each optical element intersect at a point lying substantially along the aiming axis.

In accordance with a preferred embodiment of the present invention, the total internal reflection plane is formed substantially along a gap comprising a material having a refractive index less than the refractive index of the optical element.

Alternatively, in accordance with another preferred embodiment of the present invention, the total internal reflection plane is formed substantially along a gap comprising two materials, one material having a refractive index less than the refractive index of the optical element, and a second material having substantially the same refractive index as the refractive index of the optical element.

Preferably the optical elements are separated from each other by a gap of material with substantially the same refractive index as the refractive indices of the optical elements.

In accordance with a preferred embodiment of the present invention, each optical element includes a prism assembly.

Further in accordance with a preferred embodiment of the present invention, each prism assembly includes two optically identical prisms positioned such that their total internal reflection planes are located symmetrically with respect to each other.

In accordance with another preferred embodiment of the present invention, each optical element has a generally conically shaped total internal reflection surface characterized by an apex, wherein the apices lie substantially on the aiming axis and the demarcations are substantially at the apices.

Additionally in accordance with a preferred embodiment of the present invention, the two optical elements have different optical dispersion characteristics.

There is also provided in accordance with a preferred embodiment of the present invention, a method of aiming a weapon including:
providing two optical elements, each having a total internal reflection surface, and wherein the two total internal reflection surfaces intersect at an intersection point; and
aligning the intersection point with a target.

There is also provided in accordance with a preferred embodiment of the present invention, a method of aiming a weapon including:
providing two optical elements mounted on the weapon, each characterized by a refractive index and a critical angle defining a total internal reflection plane, positioned one in front of the other substantially along an aiming axis,
each optical element causing a portion of light impinging thereon at an angle greater than the critical angle, to be reflected, thereby defining a demarcation between a region of reflected light and non-reflected light,
the optical elements being oriented such that the demarcations of each optical element intersect at an intersection point lying substantially along the aiming axis, and
aligning the intersection point with the target.

BRIEF DESCRIPTION OF THE DRAWINGS

The present invention will be understood and appreciated from the following detailed description, taken in conjunction with the drawings in which:

FIGS. 2A and 2B are respective simplified pictorial and exploded illustrations of prism assemblies of the optical aiming device of FIG. 1, constructed and operative in accordance with a preferred embodiment of the present invention;

FIGS. 3A and 3B are respective simplified pictorial and exploded illustrations of prism assemblies of the optical aiming device of FIG. 1, constructed and operative in accordance with another preferred embodiment of the present invention;

DETAILED DESCRIPTION OF PREFERRED EMBODIMENTS

Figure 1:
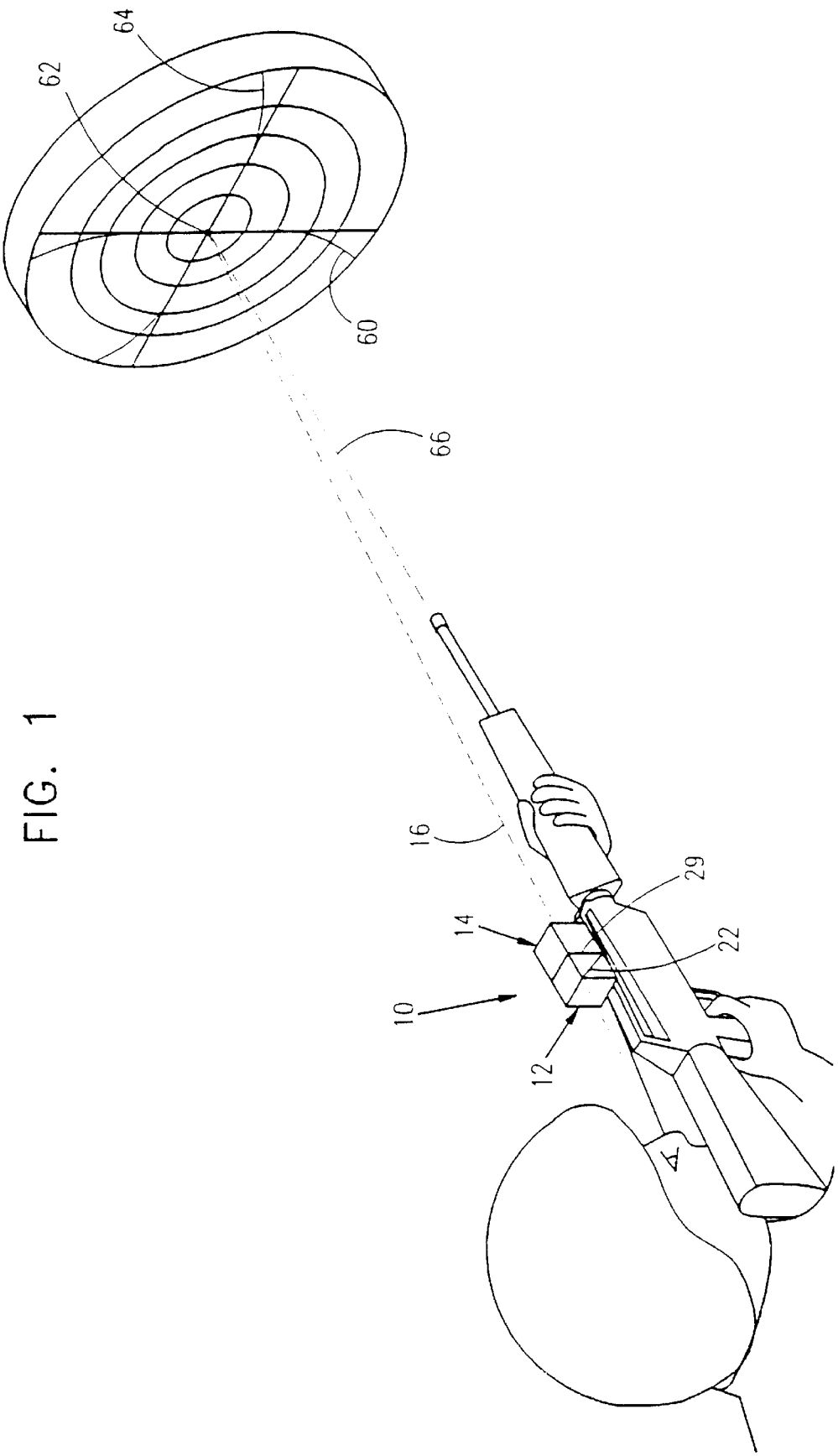
FIG. 1 is a simplified pictorial illustration of an optical aiming device constructed and operative in accordance with a preferred embodiment of the present invention.

Reference is now made to FIG. 1 which illustrates an optical aiming device 10 constructed and operative in accordance with a preferred embodiment of the present invention. Optical aiming device 10 includes two optical elements 12 and 14, generally of the same optical material, positioned one in front of the other substantially along an aiming axis 16.

Reference is now made to FIGS. 2A and 2B. In accordance with a preferred embodiment of the present invention, optical element 12 is a prism assembly which includes two optically identical prisms 12a and 12b positioned such that their total internal reflection planes, 18 and 20 respectively, are located symmetrically with respect to each other. Prisms 12a and 12b are preferably separated from each other by a gap, designated by reference numeral 22 as seen in FIG. 2A. Gap 22 preferably comprises a material, such as air or transparent glue, with a refractive index less than the refractive indices of the prisms 12a and 12b.

In accordance with another preferred embodiment of the present invention, gap 22 comprises two materials, one with a refractive index less than the refractive indices of the prisms 12a and 12b, and a second material with substantially the same refractive index as the refractive indices of the prisms 12a and 12b.

Optical element 14 is preferably a prism assembly which includes two optically identical prisms 14a and 14b positioned such that their total internal reflection planes, 24 and 26 respectively, are located symmetrically with respect to each other. Prisms 14a and 14b are preferably separated from each other by a gap, designated by reference numeral 28 as seen in FIG. 2A. Gap 28 includes a material, such as air or transparent glue, with a refractive index less than the refractive indices of the prisms 14a and 14b.

In accordance with another preferred embodiment of the present invention, gap 28 comprises two materials, one with a refractive index less than the refractive indices of the prisms 14a and 14b, and a second material with substantially the same refractive index as the refractive indices of the prisms 14a and 14b.

Optical elements 12 and 14 are preferably separated by a gap 29, as shown in FIG. 2A. Gap 29 preferably includes a material with substantially the same refractive index as the refractive indices of the prisms 12a, 12b, 14a and 14b.

The arrangement of two optically identical prisms positioned such that their total internal reflection planes are located symmetrically with respect to each other, substantially eliminates distortions as is known in the art.

It is appreciated by persons skilled in the art, that optical elements 12 and 14 may be constructed from prism shapes other than those shown in FIGS. 2A and 2B. Reference is now made to FIGS. 3A and 3B which illustrate another construction of optical elements 12 and 14 in accordance with a preferred embodiment of the present invention. In this embodiment, optical element 12 includes two prisms 12c and 12d positioned such that their total internal reflection planes, 30 and 32 respectively, are located symmetrically with respect to each other. Prisms 12c and 12d are preferably separated from each other by a gap, designated by reference numeral 34 as seen in FIG. 3A. Gap 34 includes a material, such as air or transparent glue, with a refractive index less than the refractive indices of the prisms 12c and 12d.

In accordance with another preferred embodiment of the present invention, gap 34 comprises two materials, one with a refractive index less than the refractive indices of the prisms 12c and 12d, and a second material with substantially the same refractive index as the refractive indices of the prisms 12c and 12d.

In the embodiment illustrated in FIGS. 3A and 3B, optical element 14 includes two prisms 14c and 14d positioned such that their total internal reflection planes, 36 and 38 respectively, are located symmetrically with respect to each other. Prisms 14c and 14d are preferably separated from each other by a gap comprising a material, such as air or transparent glue, with a refractive index less than the refractive indices of the prisms 14c and 14d. The gap between prisms 14c and 14d is not seen in the view illustrated in FIG. 3A.

In accordance with another preferred embodiment of the present invention, the gap between prisms 14c and 14d comprises two materials, one with a refractive index less than the refractive indices of the prisms 14c and 14d, and a second material with substantially the same refractive index as the refractive indices of the prisms 14c and 14d.

Optical elements 12 and 14 are preferably separated by a gap 39, as shown in FIG. 3A. Gap 39 preferably comprises a material with a refractive index substantially the same as the refractive indices of the prisms 12c, 12d, 14c and 14d.

It is appreciated by persons skilled in the art, that optical elements 12 and 14 may be constructed from prisms other than those shown in FIGS. 2A–3B. Generally prisms 12a, 12b, 14a and 14b illustrated in FIGS. 2A and 2B are less expensive to manufacture than prisms 12c, 12d, 14c and 14d shown in FIGS. 3A and 3B. Prisms 12c, 12d, 14c and 14d, however, have the advantage of being more compact in design and providing a larger field of view. For purposes of simplicity, the rest of the specification is described with reference to the embodiment shown in FIGS. 2A and 2B.

Figure 4:
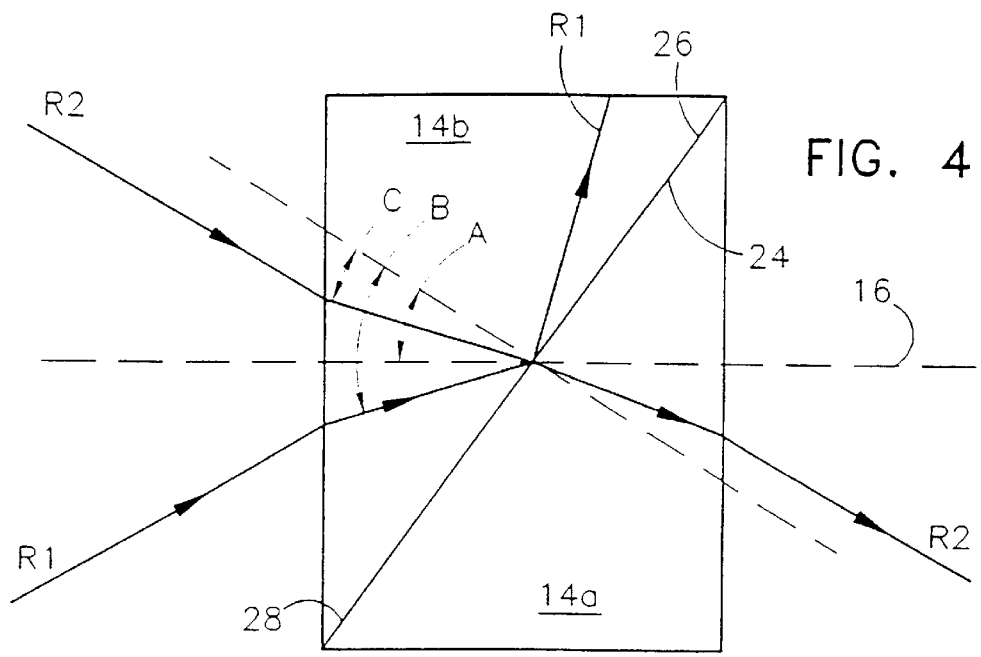
FIG. 4 is a simplified diagram of light rays impinging upon a total internal reflection surface of one of the prism assemblies shown in FIG. 2A.

Reference is now made to FIG. 4 which illustrates the phenomenon of total internal reflection associated with prisms 14a and 14b. It is appreciated that the explanation given here applies equally to other prisms, such as prisms 12a and 12b.

Prism 14b is characterized by a refractive index and a critical angle A, which is shown in FIG. 4, defining the total internal reflection plane 26. As described hereinabove with reference to FIG. 2A, the total internal reflection plane 26 of prism 14b is symmetrical with total internal reflection plane 24 of prism 14a and is separated therefrom by gap 28.

A typical ray R1 of the visible light emanating from a target and impinging on prism 14b at an angle greater than or equal to critical angle A, such as an angle B shown in FIG. 4, is reflected by prism 14b. Another typical ray R2 of the visible light emanating from the target, such as that impinging by an angle C which is less than critical angle A, is refracted through prisms 14b and 14a.

Figure 5A:
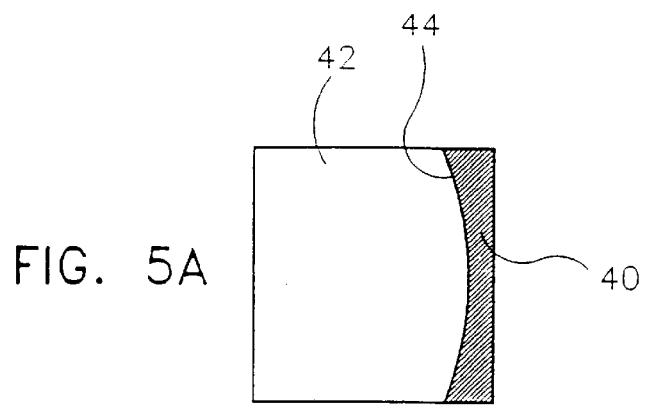
FIG. 5A is a simplified illustration of a view through one prism assembly of FIG. 2A.

Light rays impinging upon prism 14b at an angle greater than critical angle A are reflected in a direction away from the user's eye and the reflected portion is perceived as being dark. Referring additionally to FIG. 5A, the reflected portion, or dark region, is designated by numeral 40.

As seen in FIG. 5A, associated with the prism assembly 14 of prisms 14a and 14b is a clear region 42 adjacent dark region 40 with a common demarcation arc 44 therebetween. Clear region 42 is caused by light coming from the target at angles less than critical angle A.

By aligning aiming axis 16 with the target, as shown in FIG. 1, demarcation arc 44 corresponds to a locus of points 60 which passes through a bull's eye 62 of the target, as seen in FIG. 1.

As seen in FIGS. 1, 2A and 2B, the two optical elements 12 and 14 are oriented such that the common total internal reflection surfaces 18 and 20 of prisms 12a and 12b are angled with respect to the common total internal reflection surfaces 24 and 26 of prisms 14a and 14b. Just as the dark region 40, the clear region 42 and the demarcation arc 44 are associated with prisms 14a and 14b, a dark region 50, a clear region 52 and a demarcation arc 54 are also associated with prisms 12a and 12b, and illustrated in FIG. 5B. Because the total internal reflection surfaces of optical elements 12 and 14 are angled with respect to each other as mentioned above, dark region 50 is angled with respect to dark region 40, as seen in FIG. 5B.

Figure 5B:
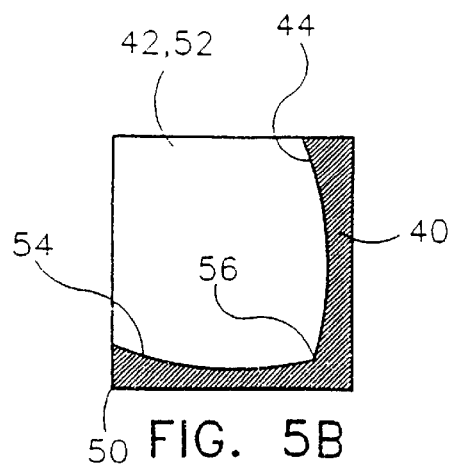
FIG. 5B is a simplified illustration of a view through both prism assemblies of FIG. 2A.

FIG. 5B illustrates what the user perceives when viewing through the optical aiming device 10 shown in FIG. 1. The user sees a clear region comprising the intersecting clear regions 42 and 52, the two dark regions 40 and 50, and demarcation arcs 44 and 54 which intersect at a point 56.

As mentioned above, by aligning aiming axis 16 with the target, as shown in FIG. 1, demarcation arc 54 corresponds to a locus of points 64 which passes through bull's eye 62, as seen in FIG. 1. Since both demarcation arcs 44 and 54 are aimed at bull's eye 62 of the target, their common point of intersection point 56 lies on the axis 16 (FIG. 1) which points to bull's eye 62.

Thus, optical device 10 is properly aimed by aligning two points: intersection point 56 and the bull's eye 62. Demarcation arcs 44 and 54 are analogous to longitudinal and latitudinal arcs respectively, which define the desired targeted point.

As is known in the art, optical elements 12 and 14 are preferably mounted on a weapon such that when axis 16 points to bull's eye 62, as seen in FIG. 1, an ammunition trajectory 66 also points to bull's eye 62. The relation between the axis 16 associated with the optical device 10 and the trajectory 66 is well known in the art, and depends on various factors such as distance to the target.

Figure 5C:
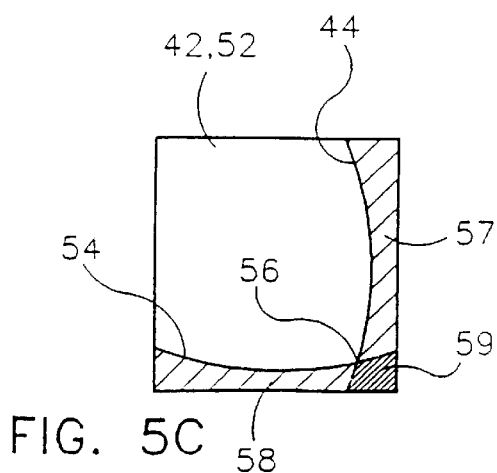
FIG. 5C is a simplified illustration of a view through both prism assemblies of FIG. 2A, wherein the prism assemblies are bonded together by discrete patches or spots of adhesive.

As mentioned hereinabove, gap 22 or gap 28 may comprise two materials, one with a refractive index less than the refractive indices of the prisms 12a and 12b, and a second material with substantially the same refractive index as the refractive indices of the prisms 12a and 12b. For example, prism assemblies 12 and 14 may be bonded together by discrete patches or spots of an adhesive. Reference is now made to FIG. 5C which illustrates a view through prism assemblies 12 and 14, wherein prism assemblies 12 and 14 are bonded together by discrete patches or spots of adhesive.

As described hereinabove with reference to FIGS. 4–5B, dark regions 40 and 50 are formed in accordance with the total internal reflection characteristics of prism assemblies 12 and 14. In the embodiment associated with FIG. 5C, since the adhesive is not continuously placed on the bonded surfaces, the total internal reflection characteristics are changed such that instead of the user's eye perceiving totally dark regions, a pair of semi-transparent regions 57 and 58 are perceived. The semi-transparency owes its existence to the discrete locations of the adhesive having a refractive index less than the refractive index of the prisms, thereby causing the light to be totally reflected and perceived as dark, while the locations without adhesive have a refractive index the same as the refractive index of the prisms, such that the light is not totally reflected and is perceived as clear. The human eye naturally mixes the small dark and clear regions and perceives them as semi-transparent.

As seen in FIG. 5C, demarcation lines 44 and 54 still intersect at point 56, just as in FIG. 5B. Semi-transparent regions 57 and 58 intersect in a dark region 59. The advantage of the semi-transparent regions 57 and 58 is that the field of view is increased and dark region 59 is smaller than both of dark regions 40 and 50 of FIG. 5B.

Figure 6:
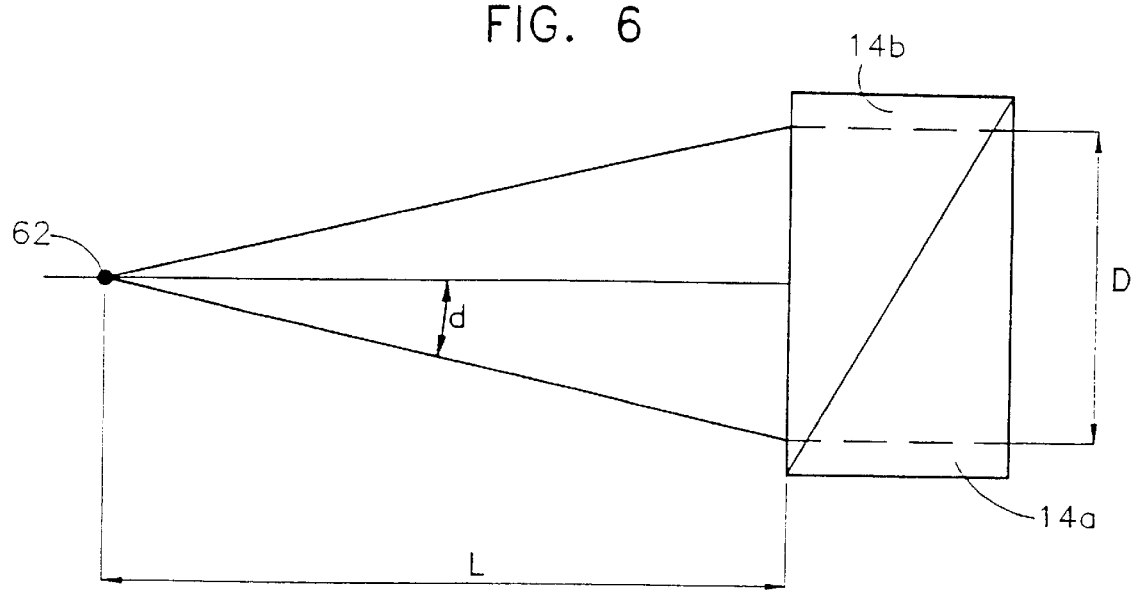
FIG. 6 is a simplified diagram showing the parallax of the optical aiming device of FIG. 1.

Reference is now made to FIG. 6 which illustrates the parallax of prisms 14a and 14b. It is appreciated that the following explanation holds just as well for prisms 12a and 12b. As is known in the art, the parallax is equal to D/2L
where D=prism square side size, and
L=distance to target.

For D=20 mm, the parallax becomes less than 1 milliradian when L>10 meters.

The material of the prisms may cause some dispersion of light therethrough. The dispersion is due to the fact that the critical angle associated with total internal reflection is a function of wavelength. The larger the wavelength the larger the critical angle. If both prisms of each prism assembly are made of the same material, there may be a dispersion of light at the demarcation arc because the total internal reflection is not at one definite plane but rather at slightly overlapping planes each corresponding to a slightly different wavelength. This dispersion is generally at the yellow color wavelength.

The yellow streak is not generally annoying to the user, although it may be eliminated by making the prisms from materials with different optical dispersion characteristics, i.e., achromatization, as is known in the art.

Figure 7:
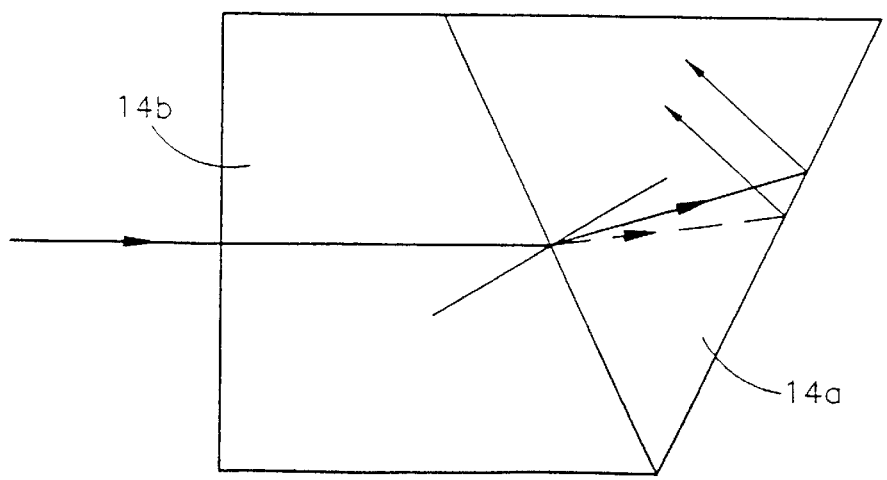
FIG. 7 is a simplified diagram of light rays passing through prisms made of two different materials.

FIG. 7 illustrates such an arrangement of prisms, in which prism 14b is made of SF11 glass and prism 14a is made of SK16 glass. SF11 glass and SK16 glass have compensating optical dispersion characteristics, thus substantially reducing the yellow streak.

Figure 8:
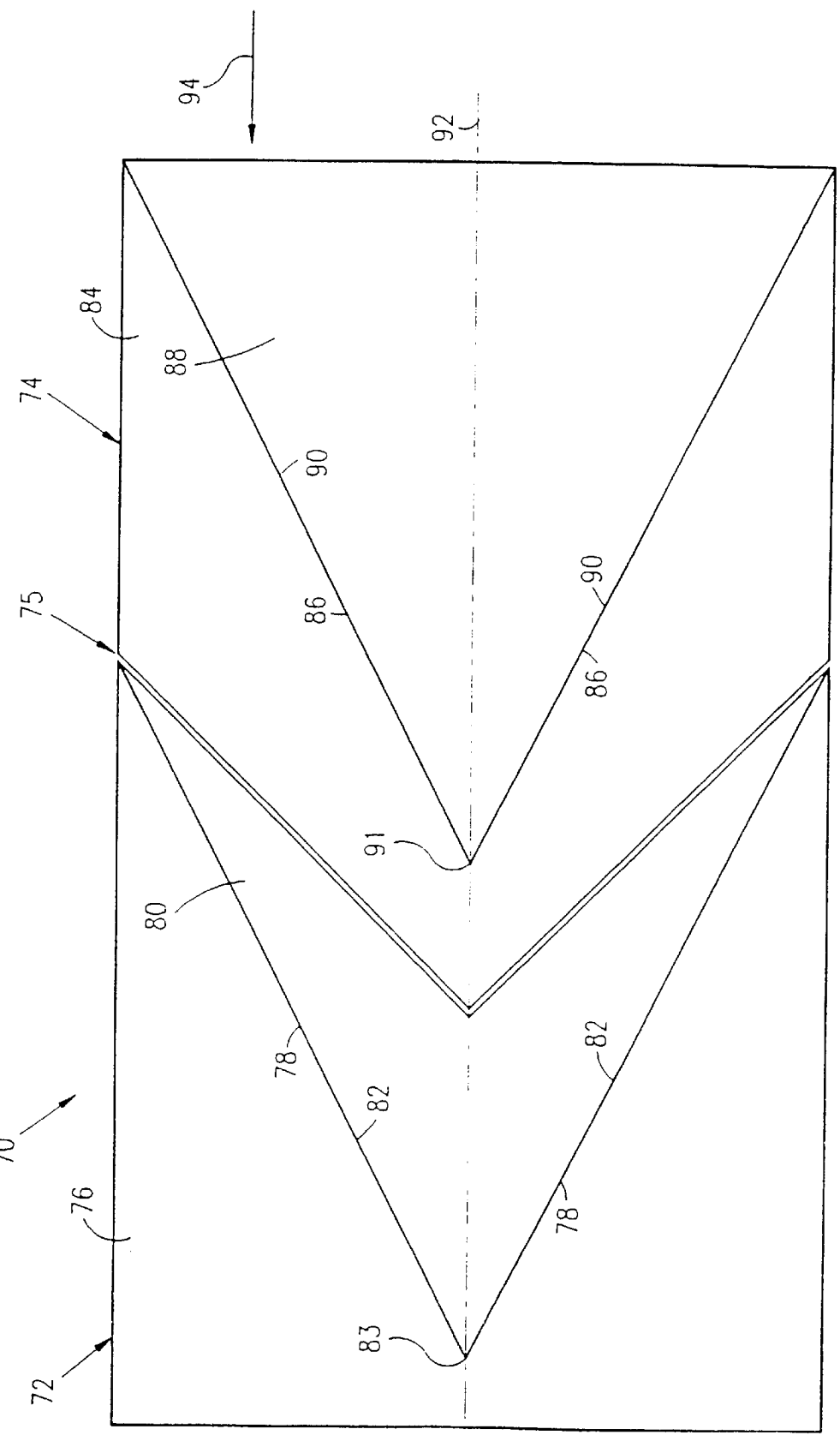
FIG. 8 is a simplified pictorial illustration of an optical aiming device constructed and operative in accordance with yet another preferred embodiment of the present invention.

Reference is now made to FIG. 8 which illustrates an optical aiming device 70 constructed and operative in accordance with yet another preferred embodiment of the present invention.

Optical aiming device 70 preferably includes two optical elements 72 and 74 separated by a gap 75. Optical element 72 preferably includes a first prism 76 which has a concave, generally conically shaped surface 78 and a second prism 80 which has a convex, generally conically shaped surface 82 which is generally complementary to the shape of surface 78. Surfaces 78 and 82 share a substantially common apex 83. Optical element 72 is characterized by a refractive index and a critical angle defining a total internal reflection plane along the interface of surfaces 78 and 82. First prism 76 may be made of acrylic and second prism 80 may be made of polycarbonate.

Optical element 74 preferably includes a third prism 84 which has a concave, generally conically shaped surface 86 and a fourth prism 88 which has a convex, generally conically shaped surface 90 which is generally complementary to the shape of surface 86. Surfaces 86 and 90 share a substantially common apex 91. Optical element 74 is characterized by a refractive index and a critical angle defining a total internal reflection plane along the interface of surfaces 86 and 90. Third prism 84 may be made of polycarbonate and fourth prism 88 may be made of polycarbonate.

Optical elements 72 and 74 are preferably positioned one in front of the other, with apices 83 and 91 lying substantially along an aiming axis 92. Since light rays enter optical aiming device 70 generally in the direction of an arrow 94, the only portion of light which impinges at an angle greater than the critical angle of both optical elements 72 and 74 is at apices 83 and 91. Thus, the demarcation between a region of reflected light and non-reflected light is merely a dark dot perceived at apices 83 and 91. The size of this dark dot may be determined, inter alia, by the geometry of surfaces 78, 82, 86 and 90, and the optical characteristics of the materials used to construct optical elements 72 and 74. For example, for sniper applications it may be desirable to fabricate optical aiming device 70 so that the size of the dark dot is about 0.5–1 MOA (minutes of arc); for marksman applications, about 4 MOA; and for practical shooting, such as IPSC (International Practical Shooting Confederation), about 16–32 MOA.

Figure 9:
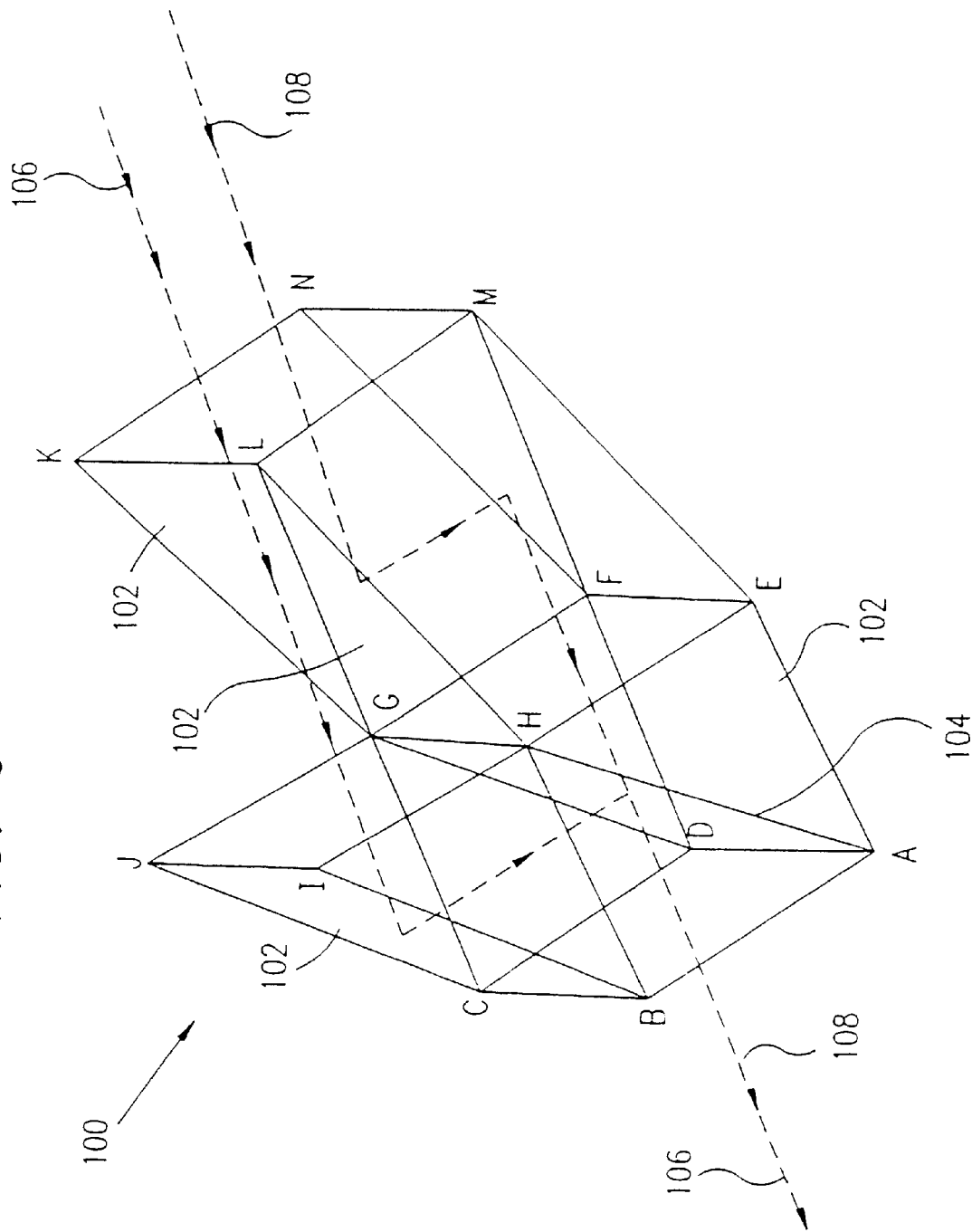
FIG. 9 is a simplified pictorial illustration of an optical aiming device constructed and operative in accordance with still another preferred embodiment of the present invention.

Reference is now made to FIG. 9 which illustrates an optical aiming device 100, constructed and operative in accordance with still another preferred embodiment of the present invention. Optical aiming device 100 preferably includes five substantially identical prisms 102, identified in FIG. 9 by the letters of their corners, namely, CBHGJI, DAHGCB, DAEFGH, FEMLGH and FMNKLG. An air gap 104 is preferably located in plane ADGH.

A first portion of light impinging upon optical aiming device 100, designated as a representative light beam 106, first passes through facet IJGH, is totally internally reflected first by facet BCJI and then by plane ADGH, and finally exits through facet ABCD. A second portion of light impinging upon optical aiming device 100, designated as a representative light beam 108, first passes through facet KLMN, is totally internally reflected by facet KLHG, is reflected by facet EFNM, is totally internally reflected by plane ADGH, and finally exits through facet ABCD. The light beams 106 and 108 are combined together at the boundary ADGH.

Figure 10:
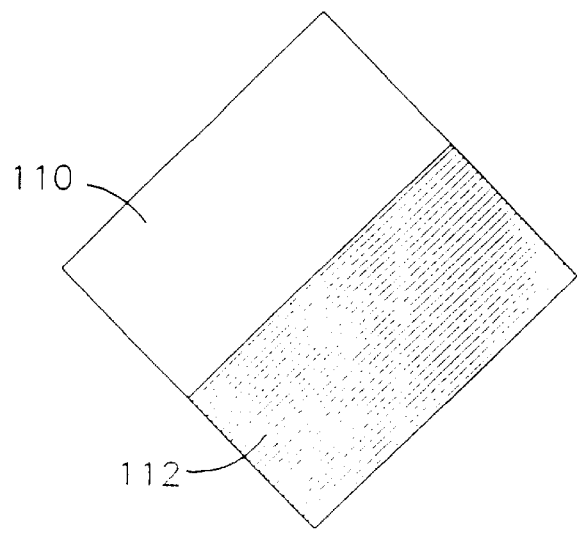
FIG. 10 is a simplified illustration of a field of view for one portion of light passing through the optical aiming device of FIG. 9.

Reference is now made to FIG. 10 which illustrates a field of view for one portion of light, represented in FIG. 9 by light beam 106, passing through the optical aiming device of FIG. 9. The field of view includes a transparent portion 110 and a generally opaque portion 112, portion 112 being created by total reflection at BCJI. It is noted that the border between portions 110 and 112 is substantially free of parallax.

Figure 11:
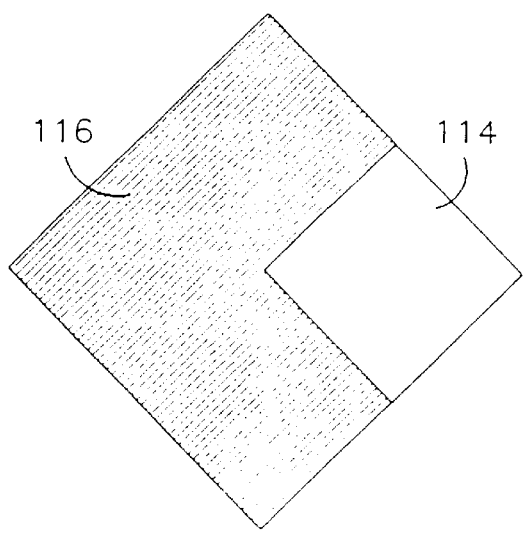
FIG. 11 is a simplified illustration of a field of view for another portion of light passing through the optical aiming device of FIG. 9.

Reference is now made to FIG. 11 which illustrates a field of view for the other portion of light, represented in FIG. 9 by light beam 108, passing through the optical aiming device of FIG. 9. The field of view includes a transparent portion 114 and a generally opaque portion 116, portion 116 being created by total reflection at FGKN, HMLE and ADGH. It is noted that the border between portions 110 and 112 is substantially free of parallax.

Figure 12:
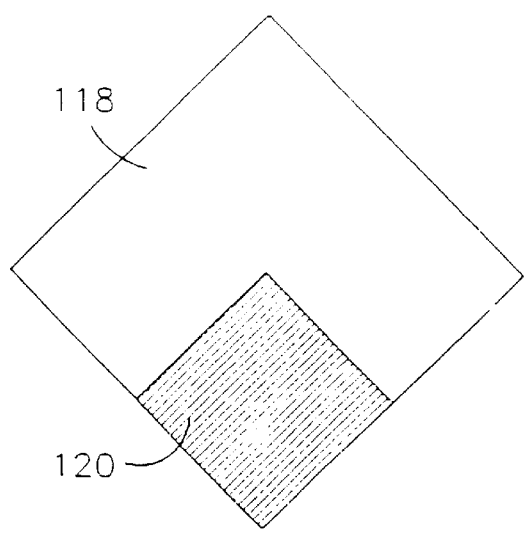
FIG. 12 is a simplified illustration of a field of view for all portions of light passing through the optical aiming device of FIG. 9.

Reference is now made to FIG. 12 which illustrates a field of view for all portions of light passing through the optical aiming device of FIG. 9. It is seen that the total field of view includes a transparent portion 118, which is a combination of transparent portions 110 and 114, and a generally opaque portion 120 which is the intersection of opaque portions 112 and 116. It is seen that optical aiming device 100 thus has a relatively large transparent portion of the total field of view.

Alternatively, instead of an air gap in plane ADGH, optical aiming device 100 may be provided with a neutral density beam splitter (R=T=50% in visible light), not shown in FIG. 9. Such an arrangement would make the boundary between the transparent and opaque portions sharper, because there is no air gap which may cause interference and multiple reflection. Such an option would also be less sensitive to manufacturing and assembly accuracies.

It is appreciated that optical aiming device 100 may be achromatized in a similar manner as described hereinabove with reference to FIG. 7.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. An optical aiming device comprising:

two optical elements, each characterized by a refractive index and a critical angle defining a total internal reflection plane, positioned one in front of the other substantially along an aiming axis, each optical element causing a portion of light impinging thereon at an angle greater than said critical angle, to be reflected, thereby defining a demarcation between a region of reflected light and non-reflected light, said optical elements being oriented such that said demarcations of each optical element intersect at a point lying substantially along said aiming axis.

2. A device according to claim 1 and wherein said total internal reflection plane is formed substantially along a gap comprising a material having a refractive index less than said refractive indices of said optical elements.

3. A device according to claim 1 and wherein said total internal reflection plane is formed substantially along a gap comprising two materials, one material having a refractive index less than said refractive indices of said optical elements, and a second material having substantially the same refractive index as said refractive indices of said optical elements.

4. A device according to claim 1 and wherein said optical elements are separated from each other by a gap comprising a material having substantially the same refractive index as said refractive indices of said optical elements.

5. A device according to claim 1 and wherein each optical element comprises a prism assembly.

6. A device according to claim 5 and wherein each prism assembly comprises two optically identical prisms positioned such that their total internal reflection planes are located symmetrically with respect to each other.

7. A device according to claim 1 wherein each optical element has a generally conically shaped total internal reflection surface characterized by an apex, wherein said apices lie substantially on said aiming axis and said demarcations are substantially at said apices.

8. A device according to claim 1 and wherein said two optical elements have different optical dispersion characteristics.

9. A method of aiming a weapon comprising:

providing two optical elements mounted on said weapon, each characterized by a refractive index and a critical angle defining a total internal reflection plane, positioned one in front of the other substantially along an aiming axis, each optical element causing a portion of light impinging thereon at an angle greater than said critical angle, to be reflected, thereby defining a demarcation between a region of reflected light and non-reflected light, said optical elements being oriented such that said demarcations of each optical element intersect at an intersection point lying substantially along said aiming axis, and aligning said intersection point with said target.

* * * * *